United States Patent
Yagame

(10) Patent No.: US 10,882,481 B2
(45) Date of Patent: Jan. 5, 2021

(54) BUMPER FASTENING STRUCTURE

(71) Applicant: Naofumi Yagame, Toyota (JP)

(72) Inventor: Naofumi Yagame, Toyota (JP)

(73) Assignees: TOYOTA JIDOSHA KABUSHIKI KAISHA, Toyota (JP); NIFCO INC., Yokosuka (JP)

( * ) Notice: Subject to any disclaimer, the term of this patent is extended or adjusted under 35 U.S.C. 154(b) by 127 days.

(21) Appl. No.: 16/378,694

(22) Filed: Apr. 9, 2019

(65) Prior Publication Data

US 2019/0322232 A1    Oct. 24, 2019

(30) Foreign Application Priority Data

Apr. 23, 2018    (JP) .................. 2018-082493

(51) Int. Cl.
*B60R 19/24* (2006.01)
*F16B 39/28* (2006.01)
*F16B 39/02* (2006.01)

(52) U.S. Cl.
CPC .............. *B60R 19/24* (2013.01); *F16B 39/02* (2013.01); *F16B 39/28* (2013.01)

(58) Field of Classification Search
CPC .......... B60R 19/24; B60R 19/02; F16B 39/28
See application file for complete search history.

(56) References Cited

U.S. PATENT DOCUMENTS

2012/0292931 A1    11/2012   Mizoguchi et al.

FOREIGN PATENT DOCUMENTS

| DE | 102012208348 A1 | 11/2012 |
| JP | 2003-231448 A | 8/2003 |
| JP | 2003-276532 A | 10/2003 |
| JP | 2004-175299 A | 6/2004 |

*Primary Examiner* — D Glenn Dayoan
*Assistant Examiner* — Melissa Ann Bonifazi
(74) *Attorney, Agent, or Firm* — Oliff PLC

(57) ABSTRACT

A bumper fastening structure fastens a front bumper, via a retainer, to a front fender. A retainer includes a body and a fixing catch that is to be fitted in a fitting hole of a fender flange. The body includes a pair of clamp walls clamping a bumper flange. At least one of the clamp walls has an inner face that is a slope face, so that a wedge-shape space is formed. The bumper flange includes a wedge-shape portion corresponding to the wedge-shape space, the wedge-shape portion having a thickness which increases toward a second through hole. The bumper fastening structure further includes a screw that tightens the clamp walls and the bumper flange together.

4 Claims, 17 Drawing Sheets

BUMPER FASTENING STRUCTURE

CROSS REFERENCE TO RELATED APPLICATION

This application claims priority to Japanese Patent Application No. 2018-082493 filed on Apr. 23, 2018, which is incorporated herein by reference in its entirety including the specification, claims, drawings, and abstract.

TECHNICAL FIELD

The present disclosure relates to a fastening structure for a bumper, and more particularly to a structure for fastening a bumper to a fender.

BACKGROUND

A bumper, which is a protection member that absorbs an impact caused by vehicle collision, is fastened to a fender, which is an adjoining member. The bumper is fastened to the fender by means of screws so as to allow replacement of the bumper, which is dented or scratched in a light collision, with a new bumper.

In fastening the bumper by means of screws, an attachment called a retainer or clip is used. As disclosed in JP 2003-231448 A and JP 2004-175299 A, for example, a retainer includes a catch to be fitted into a through hole formed in a flange disposed at an end of a fender, and a body having an U-shape in side view for clamping or catching a flange disposed at an end of the bumper.

JP 2004-175299 A further discloses that the catch having a pin shape includes a screw hole formed therein. After the catch is fitted into the through hole of the fender to temporarily secure the retainer to the fender, a screw is screwed into the screw hole. The screw may be a tapping screw, for example. As illustrated in FIG. 16, the diameter W2 of the screw is larger than the diameter W1 of the screw hole. Therefore, the screw 102 which is screwed into the screw hole 100 increases the diameter of the catch 104, thereby securing the retainer 106 to the fender 108 firmly.

JP 2004-175299 A further discloses that, to prevent removal of the bumper from the retainer during the temporary securing, the bumper includes a through hole, and the retainer includes a cylindrical portion which is to be fitted into the through hole.

SUMMARY

When screwing the screw to increase the diameter of the catch, the screw 102 is inserted with its center axis L200 being inclined with respect to the center axis L100 of the screw hole, as illustrated in FIG. 17. This is called diagonal fastening. Diagonal fastening results in uneven amounts of increase in the diameter of the catch 104. In the example illustrated in FIG. 17, for example, the amount of increase in the diameter of the catch 104 in the RW axis direction or in the vehicle width direction is larger in a relatively upper portion of the catch 104 than that in the lower portion of the catch 104, as indicated by a dashed line. This uneven amount of increase in the diameter causes a design surface 108A (outer surface) of the fender 108 and a design surface 110A of the bumper 110 to be misaligned, thereby deteriorating the outer appearance or outer look of the vehicle.

Embodiments of the disclosure are therefore directed toward providing a bumper fastening structure that allows more precise alignment between a bumper and a fender than in conventional structures, without increased working burden such as strict management of the screwing angle.

The disclosure relates to a bumper fastening structure configured to fasten a bumper to a fender via a retainer serving as a retaining member. The retainer may include a body and a fixing catch. The body may have a U shape and include a pair of clamp walls configured to clamp a bumper flange that is a terminal end of the bumper and a connecting wall configured to connect the pair of clamp walls. The fixing catch may protrude from an outer face of a first one of the clamp walls, and may be fitted in a fitting hole formed in a fender flange that is a terminal end of the fender. The fixing catch may include a screw hole formed in a protruding direction of the fixing catch. The pair of clamp walls may have a temporary securing projection on at least one of inner faces. A second one of the clamp walls may include a first through hole along an extension line of the screw hole. At least one of the pair of clamp walls may include a slope face on the inner face, such that a distance between the inner surfaces of the pair of clamp walls increases toward the screw hole and a wedge-shape space is formed. The bumper flange may include a second through hole aligned with the screw hole and the first through hole, an engaging portion configured to engage with the temporary securing projection, and a wedge-shape portion corresponding to the wedge-shape space and having a thickness increasing toward the second through hole along a central axis direction of the second through hole. The screw may be screwed into the screw hole via the first through hole and the second through hole, to increase the diameter of the fixing catch and tighten the pair of clamp walls and the bumper flange clamped between the pair of clamp walls together.

The above disclosure is configured to cause the screw to be screwed into the retainer and the bumper flange which are temporarily secured by means of engagement between the temporary securing projection and the engaging portion. The retainer may include the wedge-shape space, and the bumper flange may include the corresponding wedge-shape portion. The wedge-shape space is narrowed with tightening of the screw, which pushes the wedge-shape portion toward the center axis of the screw hole. Thus, control of the fastening torque of the screw allows adjustment of the amount of relative movement between the bumper flange and the retainer, further allowing alignment between the bumper and the fender to which the retainer is secured.

In the above disclosure, the temporary securing projection may be a cylindrical projection formed on the inner face of one of the clamp walls to surround the screw hole. In this case, the temporary securing projection may be inserted in the second through hole of the bumper flange, and the outer surface of the temporary securing projection and the inner surface of the second through hole may be spaced from each other.

The above disclosure, in which the outer surface of the temporary securing projection and the inner surface of the second through hole are spaced from each other, may not inhibit relative movement between the bumper flange and the retainer.

In the above disclosure, the bumper may include a bumper body connected to a first end of the bumper flange and having a design surface. The bumper flange may have a second end that may be a tip end that comes into contact with the connecting wall of the retainer. The fender may include a fender body connected to a first end of the fender flange and having a design surface. In this structure, the design surface of the bumper body and the design surface of the fender body are aligned when the tip end of the bumper flange comes into contact with the connecting wall of the retainer.

The above disclosure, in which alignment between the design surface of the bumper and the design surface of the fender is accomplished by the tip end of the bumper flange coming into contact with the connecting wall of the retainer, mitigates burden of management for the fastening torque of the screw that determines the relative movement between the bumper flange and the retainer.

The disclosure enables alignment of the bumper with the fender more precisely than in conventional structures, without increased working burden including strict management of the screwing angle, for example.

BRIEF DESCRIPTION OF DRAWINGS

Embodiments of the present disclosure will be described by reference to the following figures, wherein.

DESCRIPTION OF EMBODIMENTS

A bumper fastening structure according to an embodiment will be described by reference to FIG. 1 to FIG. 15. In FIG. 1 through FIG. 15, the vehicle forward-rearward direction (hereinafter will be referred to as vehicle length direction, as appropriate) is indicated with an axis denoted by a symbol FR, the vehicle width direction is indicated by an axis denoted by a symbol RW, and the normal direction (hereinafter will be referred to as the vehicle height direction) is indicated by an axis denoted by a symbol UP. FR is an abbreviation of Front, and the forward direction of the vehicle length direction axis FR is directed to the front of a vehicle. RW is abbreviation of Right Width, and the forward direction of the vehicle width direction axis RW is directed to the right in the width direction. The forward direction of the vehicle height direction axis UP is directed to the upward direction.

Figure 1:
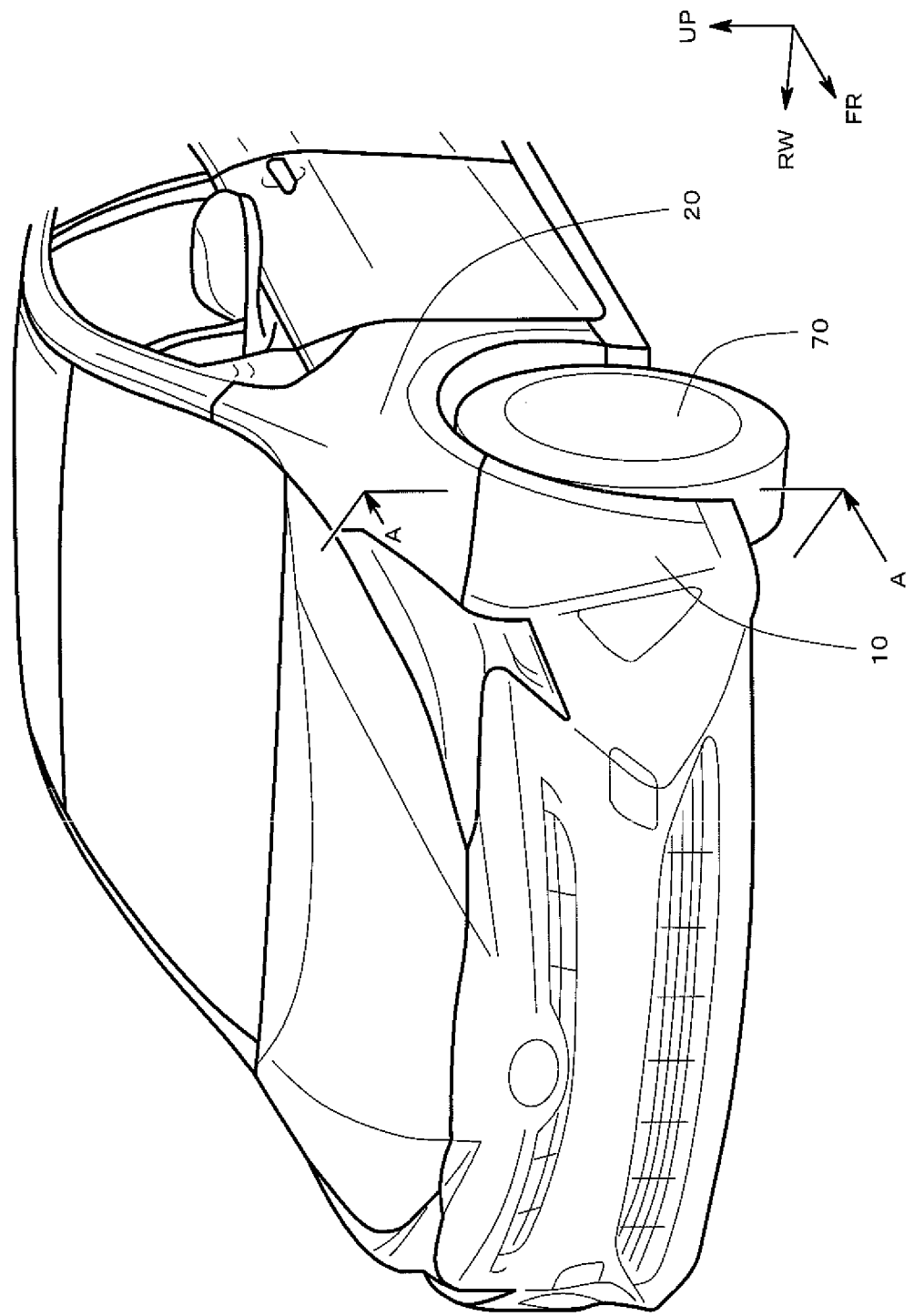
FIG. 1 is a perspective view illustrating a vehicle on which a bumper fastening structure according to an embodiment is mounted.

FIG. 1 illustrates a front perspective view of a vehicle on which a bumper fastening structure of the present embodiment is mounted. In the following description, a front bumper 10 will be described as an example bumper, and a front fender 20 will be described as an example fender. However, the bumper fastening structure according to the embodiment may also be applied to a rear bumper and a rear fender.

Referring to FIG. 1, the front bumper 10 is fastened to the front fender 20 at opposite sides or opposite lateral ends. An upper portion in the center portion of the front bumper 10 is also fastened to a radiator support retainer which is not shown. The bumper fastening structure according to the present embodiment is used as the former fastening structure; that is, the fastening structure at opposite sides, of these fastening structures.

Figure 2:
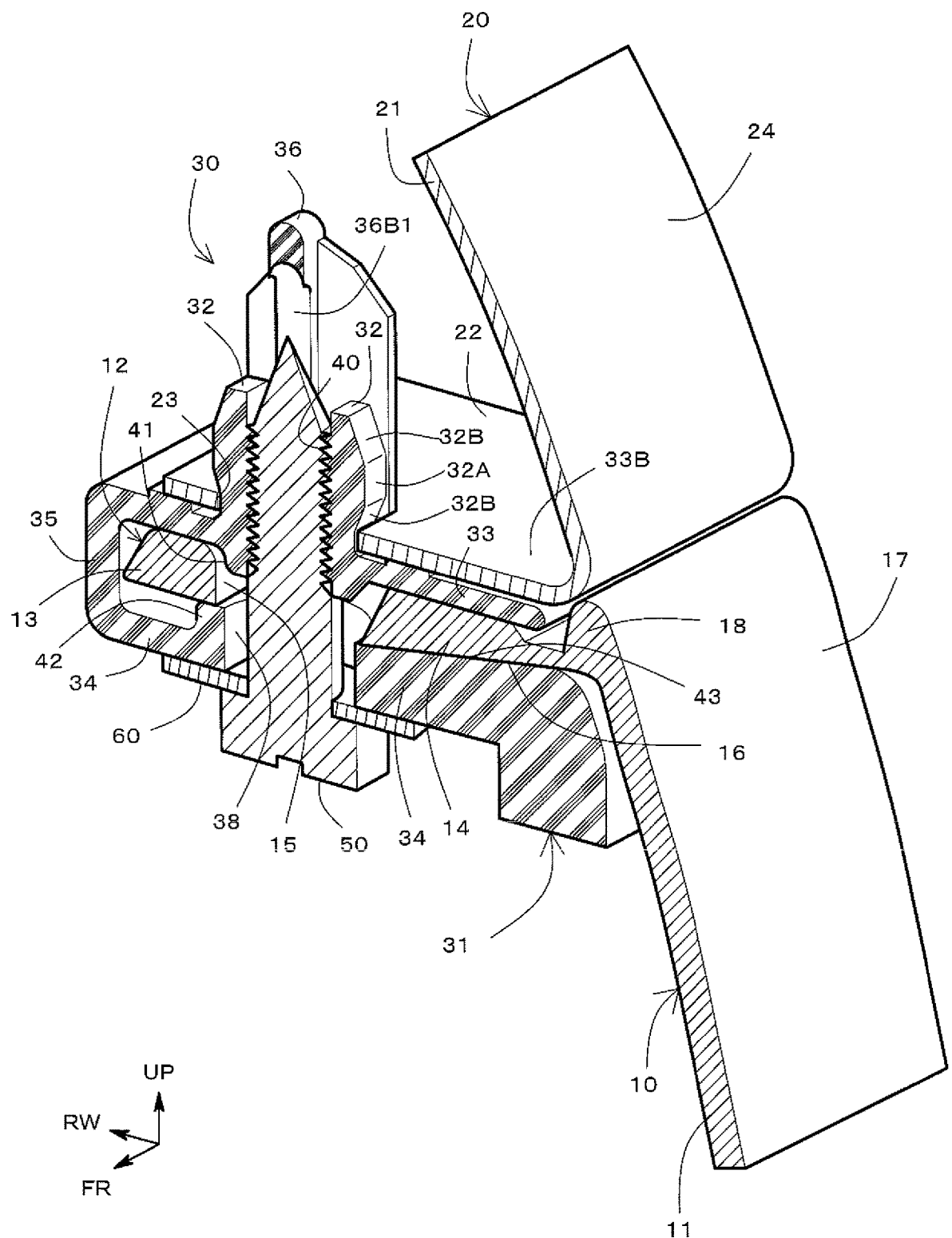
FIG. 2 is a perspective cross sectional view taken along line A-A in FIG. 1.

FIG. 2 is a perspective cross sectional view taken along line A-A in FIG. 1. The bumper fastening structure according to the embodiment includes the front bumper 10, the front fender 20, a retainer 30, a screw 50, and a washer 60.

The bumper fastening structure according to the embodiment fastens the front bumper 10 to the front fender 20 via the retainer 30 serving as a retaining member. As will be detailed below, a bumper flange 12 is clamped by a body 31 of the retainer 30. A fixing catch 32 of the retainer 30 is further fitted into a fitting hole 23 of a fender flange 22. In addition, the body 31 of the retainer 30 and the bumper flange 12 are secured tightly together by means of the screw 50 to move a wedge-shape portion 14 of the bumper flange 12. This action finally makes a design surface 24 of the front fender 20 and a design surface 17 of the front bumper 10 aligned or flush with each other.

The front fender 20 is a panel member placed at each of opposite lateral sides in the front of the vehicle for covering a front wheel 70 (see FIG. 1). The front fender 20 may be made by press-molding an aluminum panel, for example.

The front fender 20 includes a fender body 21 and the fender flange 22. The fender body 21 is a panel member placed substantially vertically, and includes the design surface 24 on its outer surface. The design surface 24 is a part of an element forming an outer design of the vehicle.

The fender body 21 is connected, at its lower end, to the fender flange 22, which is a terminal end of the front fender 20. The fender flange 22 is a plate member extending substantially horizontally; the extending length of the fender flange 22 is determined as appropriate in accordance with the vehicle width and the width of an engine compartment; that is, the length in the vehicle width direction, for example.

The fender flange 22 includes the fitting hole 23 through its thickness direction. The fixing catch 32 of the retainer 30 is fitted into this fitting hole 23. The inner diameter of the fitting hole 23 may be smaller than the maximum outer diameter R1 (see FIG. 3) of the fixing catch 32. Thus, in fitting the fixing catch 32 into the fitting hole 23, the fixing catch 32 is inserted into the fitting hole 23 in a temporarily collapsed state; that is, with its diameter temporarily reduced.

The front bumper 10 is a protection member disposed at the front end of the vehicle, and extends along the entire width of the vehicle as illustrated in FIG. 1. As described above, the upper portion in the center of the front bumper 10 in the vehicle width direction is fastened to and supported by the radiator support retainer which is not shown. The front bumper 10 is further fastened, via the retainer 30, to the front fender 20 at each of the opposite lateral ends in the vehicle width direction. The front bumper 10 is made of an aluminum panel by press molding, for example.

The front bumper 10 includes a bumper body 11 and the bumper flange 12. The bumper body 11 is a panel member extending substantially vertically, and, in a vehicle crash, collides against an obstacle and deforms to thereby absorb the impact. The bumper body 11 further includes the design surface 17 on its outer surface. The design surface 17 is a part of an element, which, along with the design surface 24 of the front fender 20, forms the outer design of the vehicle.

Fastening of the front bumper 10 requires that the design surface 17 of the front bumper 10 and the design surface 24 of the front fender 20 be aligned. It is required, for example, that the two design surfaces 17 and 24 are aligned such that they are flush with each other and such that one does not protrude with respect to the other. As will be described below, the bumper fastening structure according to the embodiment allows the design surfaces 17 and 24 to be aligned by tightening the screw 50.

The bumper flange 12 which is a terminal end of the front bumper 10 is connected to the upper end of the bumper body 11. More specifically, the front bumper 10 includes, at its uppermost end, a rib 18 which makes the bumper flange 12 and the retainer 30, for example, invisible from outside the vehicle after fastening of the front bumper 10. The bumper flange 12 extends horizontally at a height below the rib 18. The bumper flange 12 is a plate member extending substantially horizontally; the extending length of the bumper flange 12 is determined as appropriate in accordance with the vehicle width, and the width; that is, the length in the vehicle width direction, of the engine compartment, for example. The bumper flange 12 has a first end connected with the bumper body 11 and an opposite second end which serves as a tip end 13 which is to be inserted into the retainer 30.

The bumper flange 12 includes the wedge-shape portion 14 and a second through hole 15. The second through hole 15 passes through the bumper flange 12 in the thickness direction or in the UP-axis direction. As will be described below, in clamping the bumper flange 12 between clamp walls 33 and 34 of the retainer 30, the second through hole 15, a screw hole 40 of the retainer 30, and a first through hole 38 are coaxially aligned.

Figure 3:
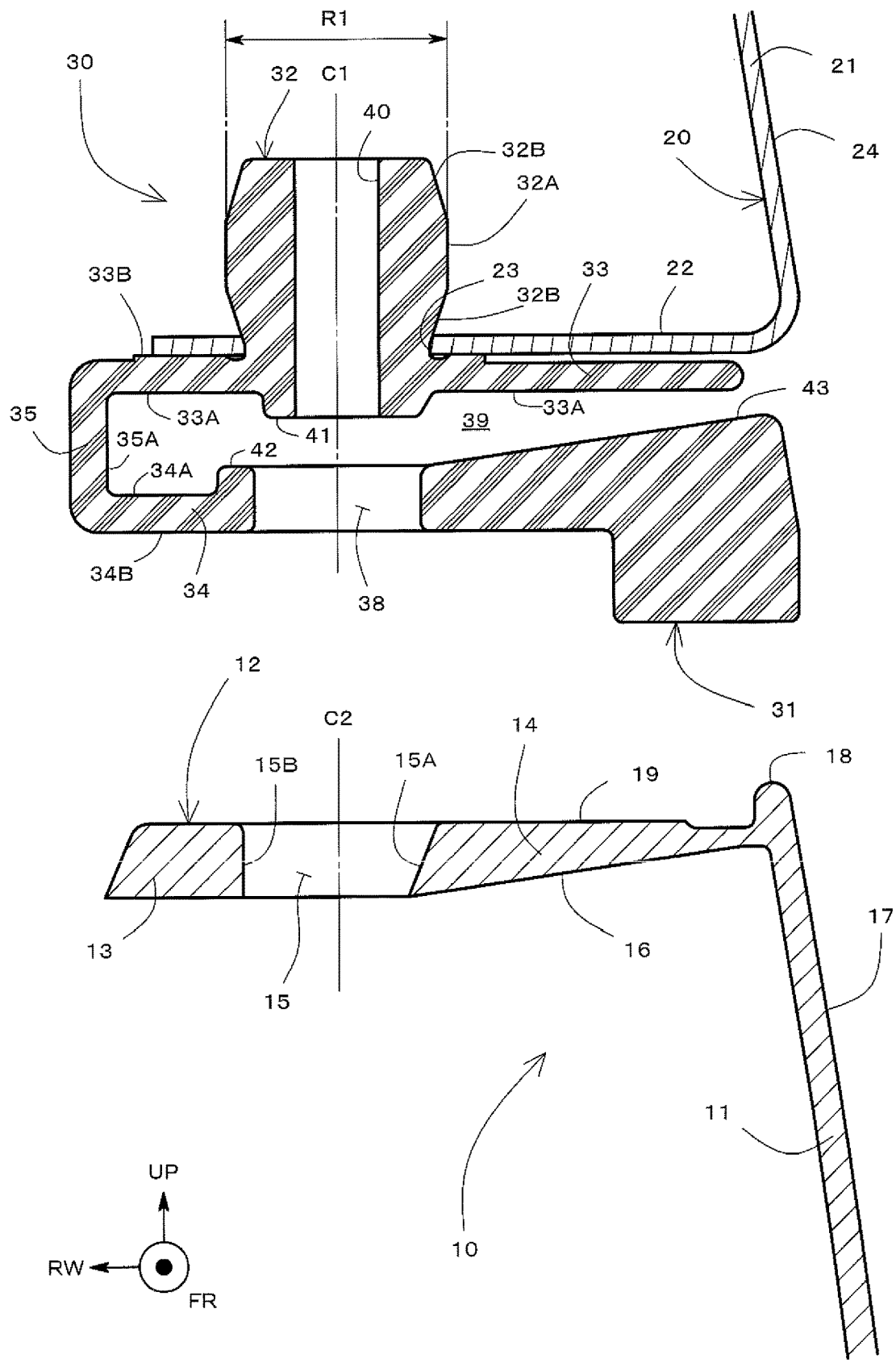
FIG. 3 is a cross sectional view taken along line A-A in FIG. 1, illustrating components of the bumper fastening structure according to the embodiment.
Figure 10:
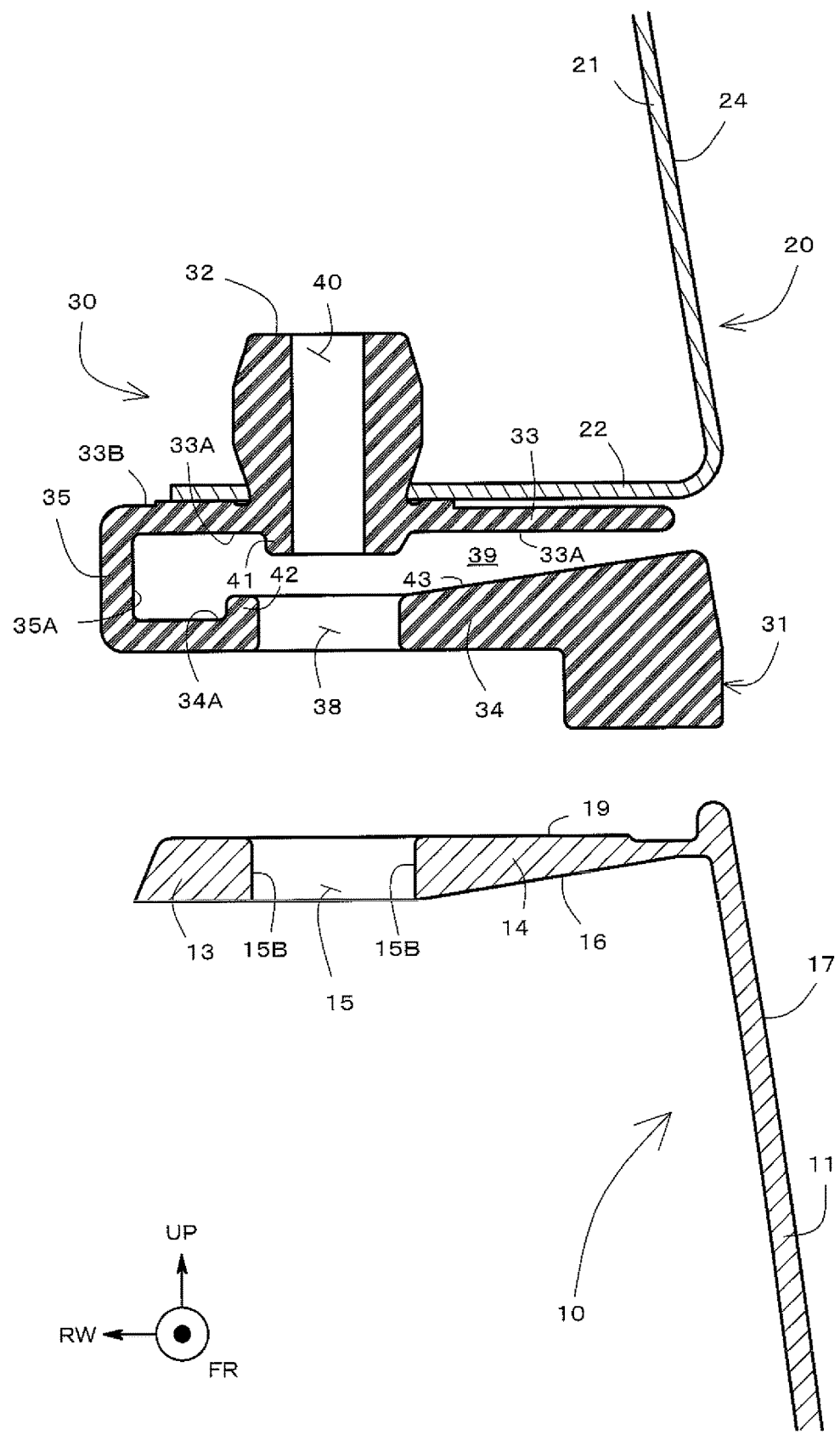
FIG. 10 is a cross sectional view taken along line A-A in FIG. 1, illustrating a modification example bumper fastening structure (a modification example of the second through hole) according to the embodiment.

Referring to FIG. 3, the second through hole 15 is formed by press molding. The second through hole 15 includes an inner surface 15B at least partially including a removing slope 15A for removing a metal mold from the bumper flange 12 after the pressing. Alternatively, as illustrated in FIG. 10, for example, the second through hole 15 may have a fixed inner diameter by eliminating the removing slope by cutting, for example, after removing the metal mold.

Figure 7:
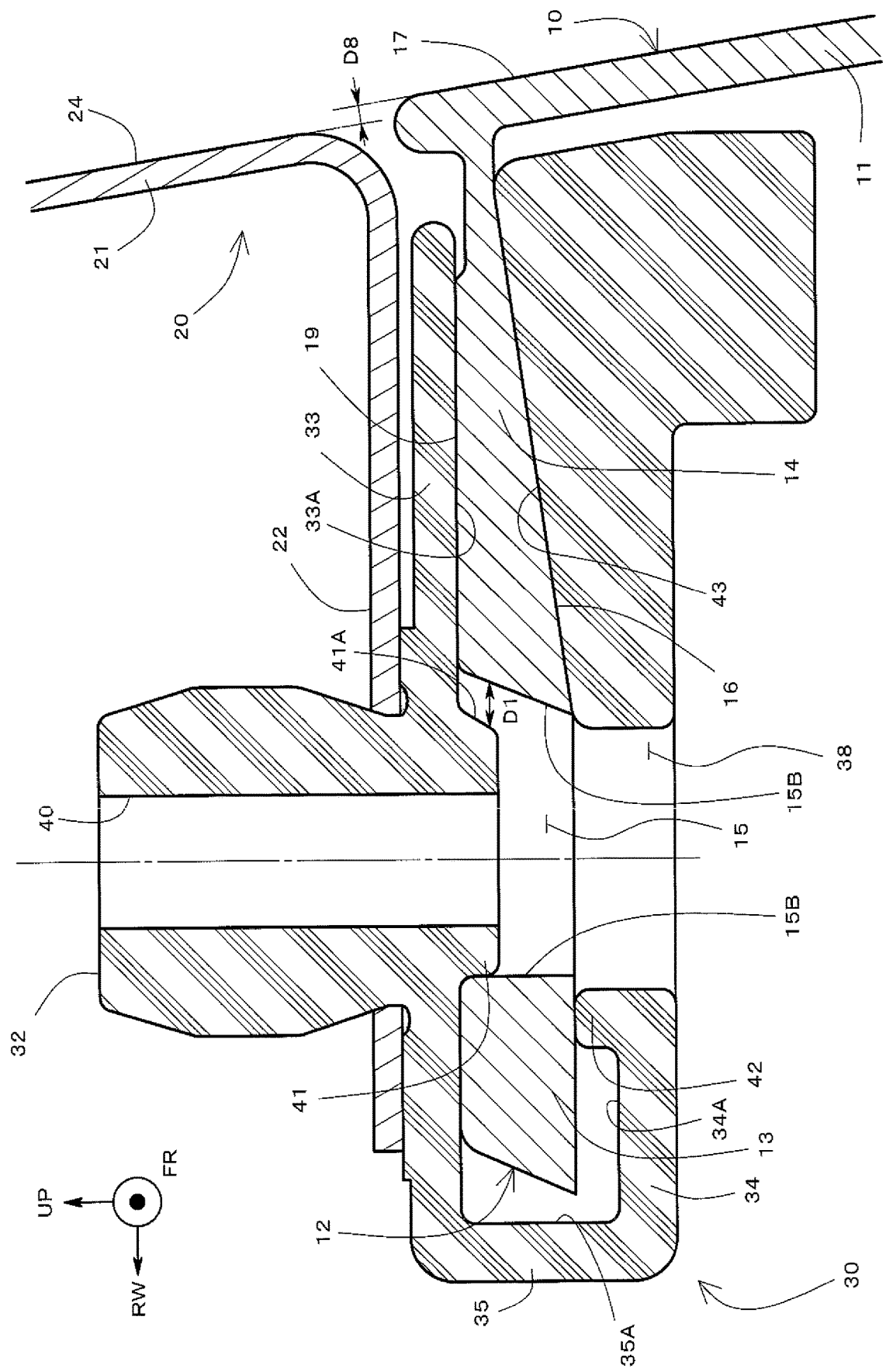
FIG. 7 is a cross sectional view taken along line A-A in FIG. 1, for explaining a second bumper fastening process (2/4) using the bumper fastening structure according to the embodiment.

Further, as illustrated in FIG. 7, when the bumper flange 12 is inserted or clamped between the clamp walls 33 and 34 of the retainer 30, a temporary securing projection 41 of the retainer 30 is inserted within the second through hole 15. As will be described below, the bumper flange 12 moves relative to the retainer 30 in accordance with tightening of the screw 50. Thus, the inner diameter of the second through hole 15 may be larger than the outer diameter of the temporary securing projection 41 of the retainer 30 and the outer diameter (nominal diameter) of the screw 50, which are inserted into the second through hole 15.

Specifically, as indicated by an interval D1 in FIG. 7, when the temporary securing projection 41 is inserted in the second through hole 15, the inner surface 15B of the second through hole 15 and an outer surface 41A of the temporary securing projection 41 may be spaced from each other at least in the vehicle width direction (RW axis direction) by a predetermined interval. This interval determines a relative movement distance or a stroke between the bumper flange 12 and the retainer 30.

When the temporary securing projection 41 of the retainer 30 is inserted into the second through hole 15, the temporary securing projection 41 is hooked within the second through hole 15 to thereby temporarily secure the bumper flange 12 to the retainer 30. The term "temporary securing" as used herein refers to a concept relative to full-scale securing achieved by tightening the screw 50, and indicates a state in which, prior to tightening the screw 50, the retainer 30 clamps the bumper flange 12 to inhibit removal of the bumper flange 12 from the retainer 30. According to such a temporary securing structure, the inner surface 15B of the second through hole 15 corresponds to an engaging portion that engages with the temporary securing projection 41.

Figure 4:
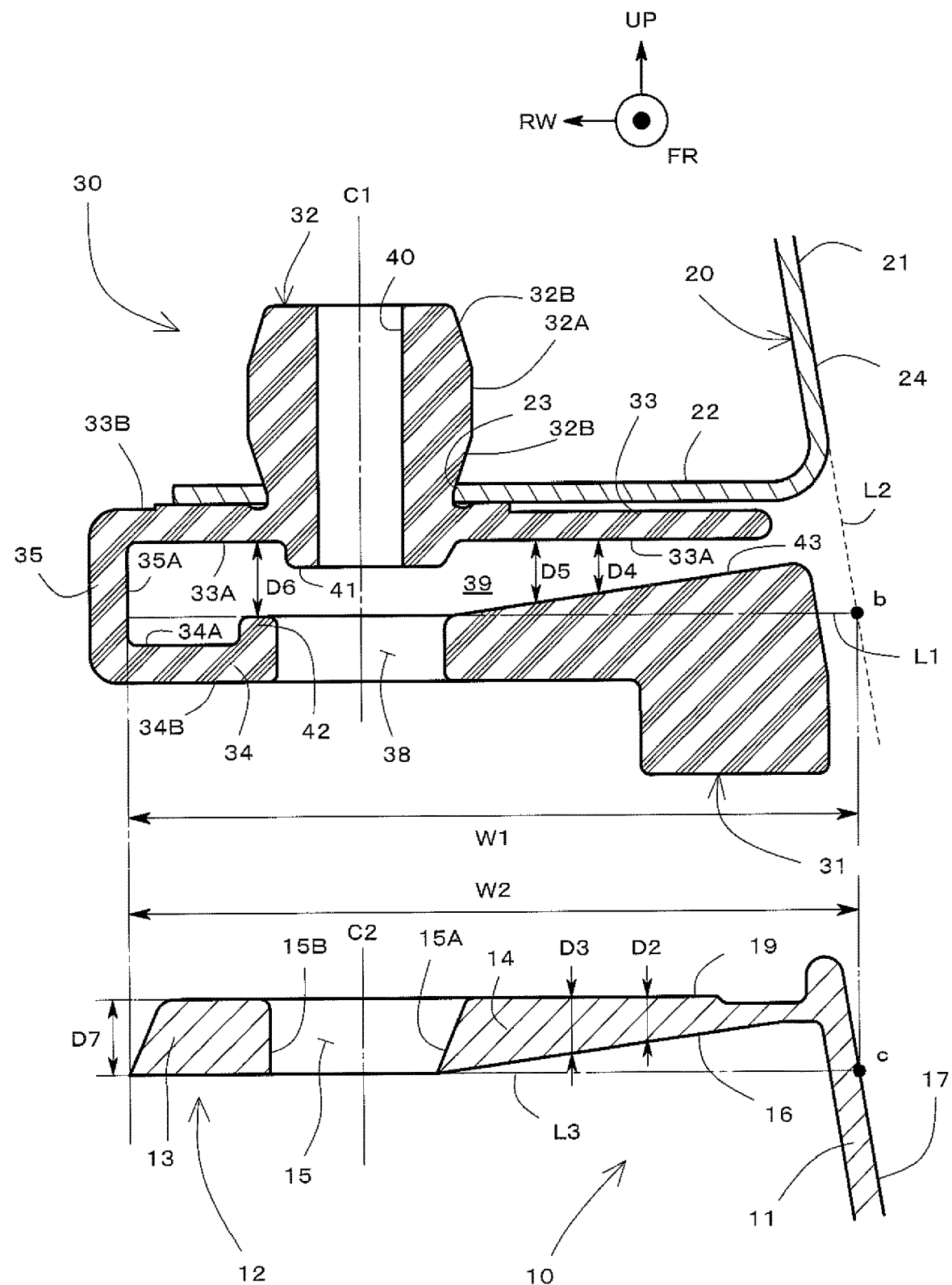
FIG. 4 a cross sectional view taken along line A-A in FIG. 1, for explaining dimensions and the like of the components of the bumper fastening structure according to the embodiment.

Referring to FIG. 4, the bumper flange 12 includes the wedge-shape portion 14. The wedge-shape portion 14 has a wedge shape as viewed in an A-A cross section or an UP-RW plane cross section. This wedge shape is obtained by forming a slope face 16 at least partially on at least one of the top surface and the bottom surface of the bumper flange 12.

The wedge-shape portion 14 has a thickness along the center axis C2 of the second through hole 15 (D2, D3, for example) that continuously increases toward the center axis C2 of the second through hole 15 (D2<D3). In FIG. 4, for example, the top surface 19 of the bumper flange 12 extends horizontally, whereas the slope face 16 of the bottom surface forms a down slope which goes vertically downward as it approaches the second through hole 15. The wedge-shape portion 14 is formed closer to the bumper body 11 with respect to the second through hole 15, for example.

The wedge-shape portion 14 is formed to correspond to the shape of a wedge-shape space 39 of the retainer 30. More specifically, the wedge-shape portion 14 and the clamp walls 33 and 34 are formed such that the top surface 19 of the wedge-shape portion 14 and an inner face 33A of the clamp wall 33 of the retainer 30 are parallel to each other and the slope face 16 of the wedge-shape portion 14 and a slope face 43 of the clamp wall 34 of the retainer 30 are parallel to each other.

As will be described below, tightening the clamp walls 33 and 34, and the bumper flange 12 clamped between the clamp walls 33 and 34 together, with the screw 50, brings the clamp walls 33 to 34 closer to each other. This narrows the wedge-shape space 39 to cause the bumper flange 12 to move toward a connecting wall 35 of the retainer 30 along the slope faces 16 and 43. The relative movement between the bumper flange 12 and the retainer 30 caused by such tightening causes the design surface 24 of the front fender 20 and the design surface 17 of the front bumper 10 to be aligned.

Figure 5:
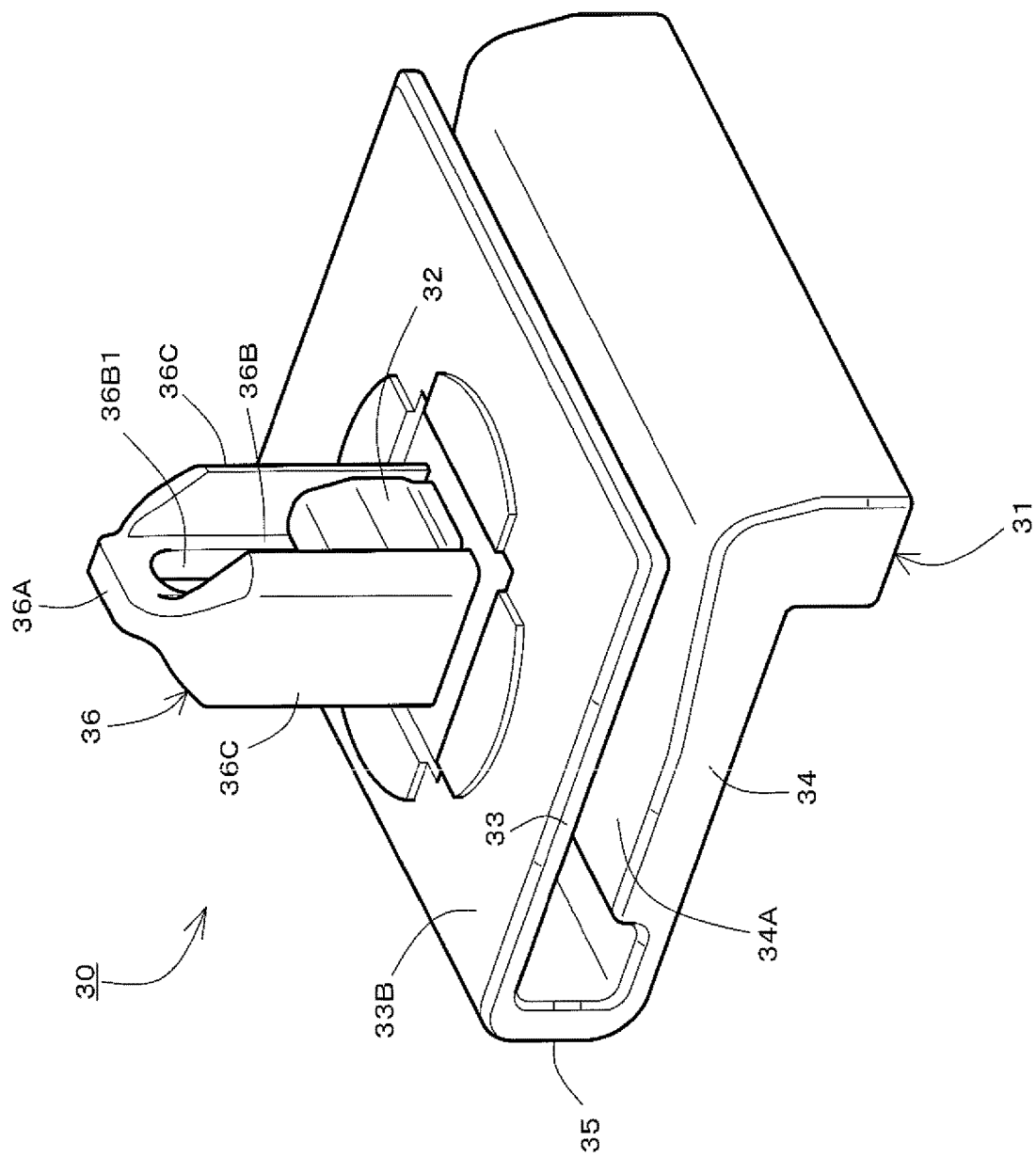
FIG. 5 is a perspective view illustrating a retainer.

FIG. 5 illustrates a perspective view of the retainer 30. The retainer 30 is a retaining member that holds the front bumper 10 and is also secured to the front fender 20. The retainer 30 is molded from a resin member, for example.

The retainer 30 includes the body 31 that clamps or catches the bumper flange 12, and a guide pin 36 and the fixing catch 32 that are fitted into a fitting hole 23 formed in the fender flange 22.

The fixing catch 32 and the guide pin 36 protrude from an outer surface 33B of the clamp wall 33 forming the body 31 (opposite to the opposed clamp wall 34) vertically to that outer surface 33B. The guide pin 36 has an H shape in a plan view, and includes a pair of opposed flanges 36C, 36C and a rib 36B disposed between the flanges 36C, 36C and connected to a tip end 36A.

Each flange 36C has an upper end that is spaced from the outer surface 33B in the height direction and tapered into the rib 36B. This forms the upper end of the guide pin 36 into the tapered tip end 36A. This tip end 36A guides and inserts the guide pin 36 into the fitting hole 23 of the fender flange 22. The rib 36B is hollowed downward or toward the outer surface 33B, to thereby form an entrance space for the screw 50.

A pair of fixing catches 32, 32 (see FIG. 2) protrude from the outer surface 33B between the flanges 36C, 36C of the guide pin 36. The fixing catch 32 includes a large-diameter portion 32A having a relatively larger diameter, and small-diameter portions 32B, 32B sandwiching the large-diameter portion 32A along the height direction and having a relatively smaller diameter. As illustrated in FIG. 3, the diameter R1 of the large-diameter portion 32A may be larger than the diameter of the fitting hole 23 of the fender flange 22.

Referring to FIG. 2 to FIG. 5, the fixing catch 32 and opposing inner surfaces 36B1, 36B1 of the rib 36B form the screw hole 40. The screw hole 40 is formed, along the extending direction of the fixing catch 32, from the upper end of the fixing catch 32 to the inner surface 33A that is a lower end, of the clamp wall 33. If the screw 50 that is to be screwed in is a tapping screw, the screw hole 40 may be a so-called pilot hole having an inner surface with no female screw thread. Alternatively, the screw hole 40 may have an inner surface with female screw thread.

The screw hole 40 has an inner diameter or a hole diameter that is smaller than the outer diameter (nominal diameter) of the screw 50. Thus, the screw 50, when screwed into the screw hole 40, increases the diameter of the fixing catch 32 to secure or fit the fixing catch 32 more firmly to the fender flange 22.

The body 31 is a U-shape member including the pair of clamp walls 33 and 34 clamping the bumper flange 12, and a connecting wall 35 connecting between the clamp walls 33 and 34. The pair of clamp walls 33 and 34 face each other along the normal direction, that is, the UP-axis direction. As described above, the fixing catch 32, and the guide pin 36 protrude on the outer surface 33B of one clamp wall 33 (opposite the other clamp wall 34).

The clamp wall 34 includes the first through hole 38 formed on the extension of the screw hole 40. For example, the first through hole 38 is formed coaxially with the screw hole 40. As described below, the screw 50 is screwed into the screw hole 40 via this first through hole 38. The first through hole 38 has an inner diameter that is larger than the outer diameter or the nominal diameter of the screw 50.

The inner surface 33A (opposite the clamp wall 34) of the clamp wall 33 includes the temporary securing projection 41. As illustrated in FIG. 2 and FIG. 3, for example, the temporary securing projection 41 may be a cylindrical projection projecting from the inner surface 33A of the clamp wall 33 toward the clamp wall 34 to enclose the screw hole 40.

In addition, the inner surface 34A of the clamp wall 34 (opposite the clamp wall 33) may also include a temporary securing projection 42. In this structure, referring to FIG. 4, the distance D6 between the temporary securing projection 42 and the inner surface 33A of the clamp wall 33 may be equal to the thickness D7 of the tip end 13 of the bumper flange.

As illustrated in FIG. 7, to clamp the bumper flange 12 with the clamp walls 33 and 34, the temporary securing projection 41 is inserted into the second through hole 15. In this state, the inner surface 15B of the second through hole 15 functions as an engaging portion that engages with the temporary securing projection 41, so that the movement or removal of the bumper flange 12 in the vehicle width direction or in the RW-axis direction is restricted. Further, the temporary securing projection 42 on the clamp wall 34 restricts the movement or wobble of the bumper flange 12 in the vehicle height direction or in the UP-axis direction.

Various modification examples are applicable to the temporary securing projections 41 and 42. For example, at least one of the inner surfaces 33A and 34A of the clamp wall 33 or the clamp wall 34 may include the temporary securing projections 41 and 42.

Figure 11:
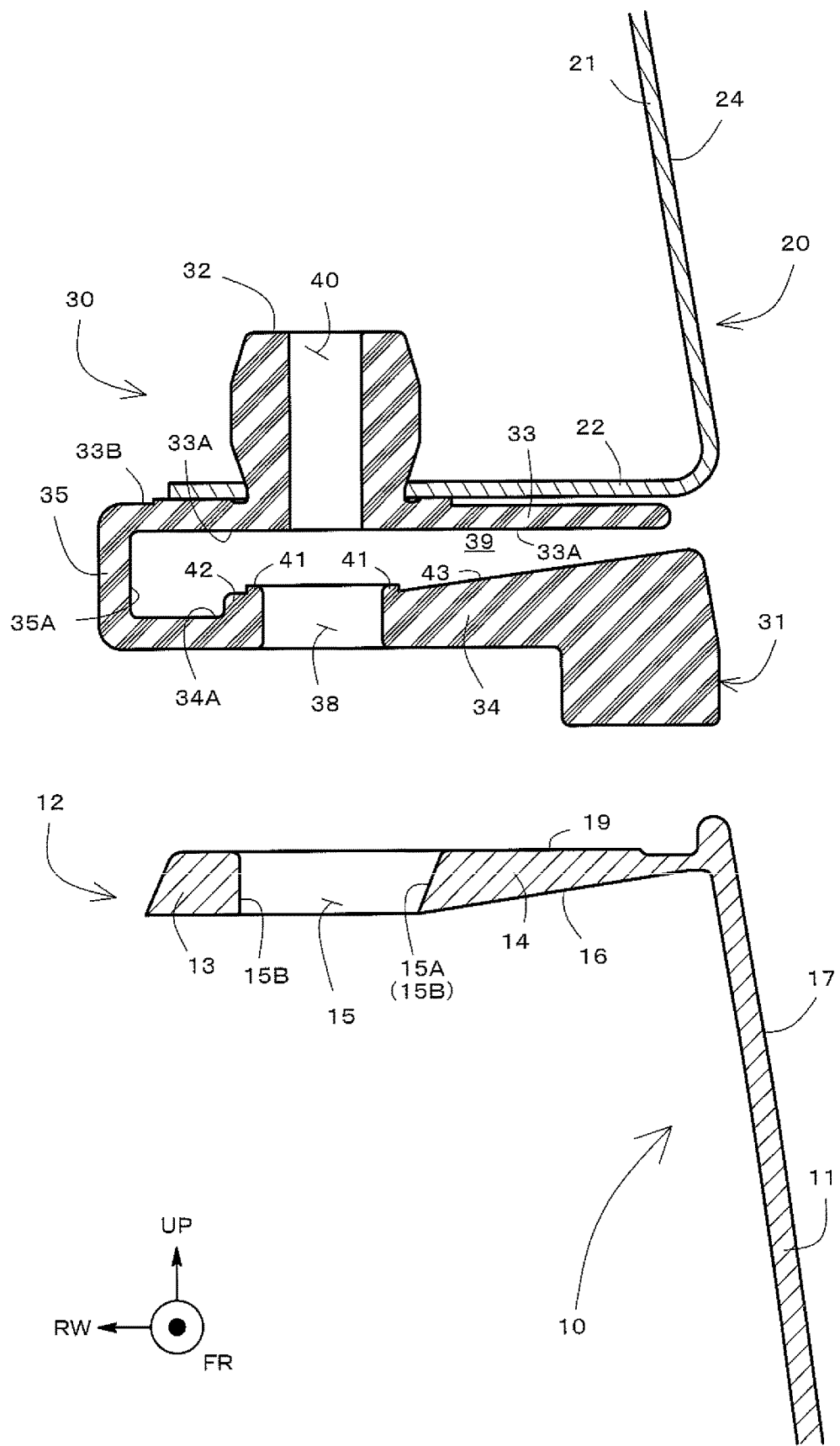
FIG. 11 is a cross sectional view taken along line A-A in FIG. 1, illustrating a modification example bumper fastening structure (a first modification example of the temporary securing projection) according to the embodiment.

For example, as illustrated in FIG. 11, the inner surface 34A of the clamp wall 34 may include the temporary securing projections 41 and 42, with the inner surface 33A of the clamp wall 33 being a flat surface without projections and recesses. In this case, the temporary securing projection 41 is a cylindrical projection projecting to enclose the first through hole 38. The temporary securing projection 41 engages with the inner surface 15B of the second through hole 15 of the bumper flange 12, to inhibit removal of the bumper flange 12 from the retainer 30.

Figure 12:
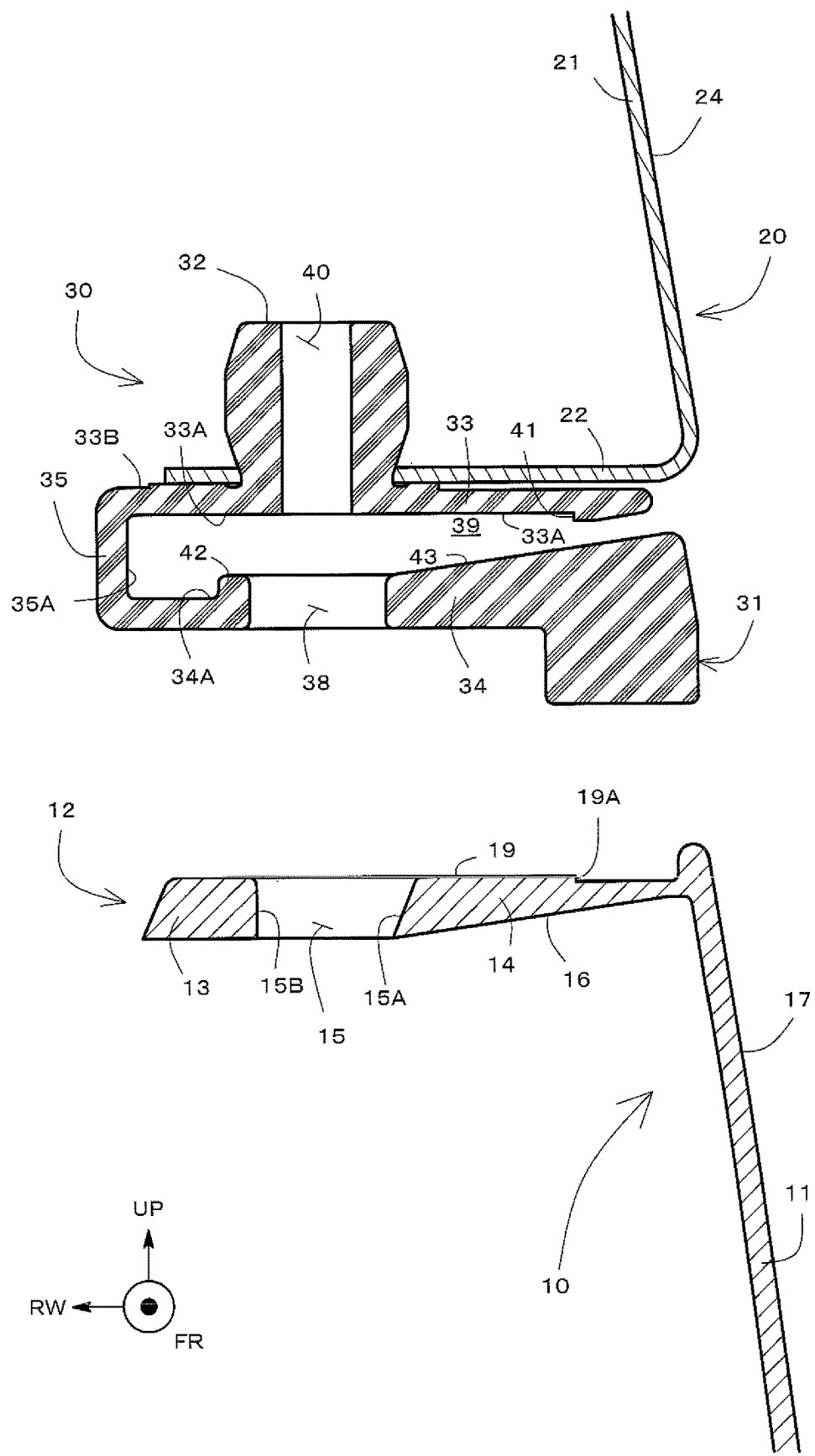
FIG. 12 is a cross sectional view taken along line A-A in FIG. 1, illustrating a modification example bumper fastening structure (a second modification example of the temporary securing projection) according to the embodiment.

Further, as illustrated in FIG. 12, the temporary securing projection 41 may be disposed at a location other than in the screw hole 40 or in the first through hole 38. For example, the temporary securing projection 41 may be formed at an inlet portion of the body 31; that is, on the inner surface 33A of the clamp wall 33 at an end portion opposite to the connecting portion of the connecting wall 35. In this case, the bumper flange 12 may also include, on the top surface 19, a hook-shape engagement portion 19A.

Figure 13:
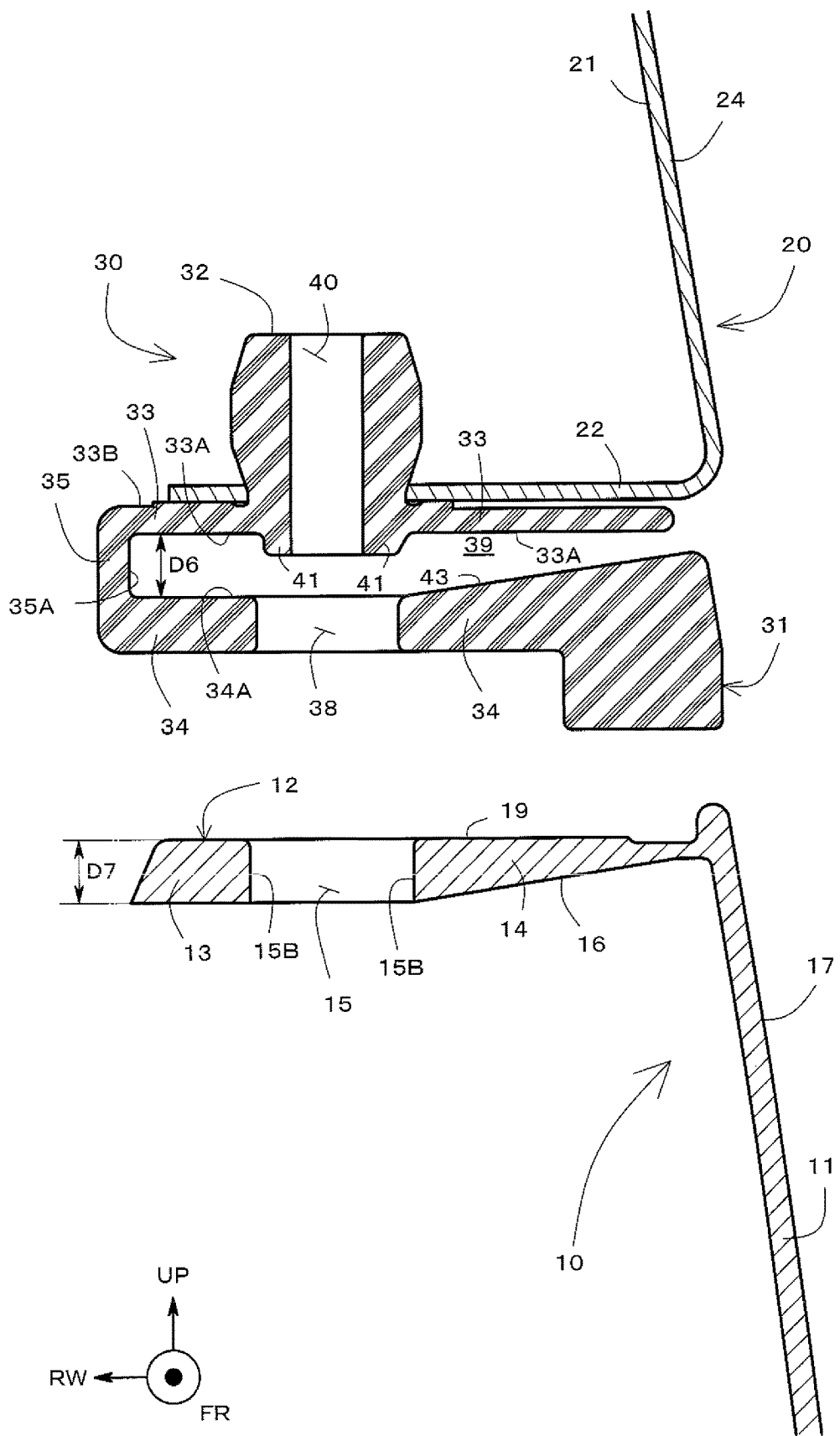
FIG. 13 is a cross sectional view taken along line A-A in FIG. 1, illustrating a modification example bumper fastening structure (a third modification example of the temporary securing projection) according to the embodiment.

The temporary securing projection 42 for reducing wobbles in the vehicle height direction may be omitted. No wobbles would be generated if the distance between inner surfaces 33A and 34A of the clamp walls 33 and 34 is equal to the thickness of the tip end 13 of the bumper flange 12. Therefore, as illustrated in FIG. 13, the inner surface 34A of the clamp wall 34 from the first through hole 38 to the connecting wall 35 may be configured to be parallel to the inner surface 33A of the clamp wall 33 from the temporary securing projection 41 to the connecting wall 35, so that the distance D6 between the inner surface 34A and the inner surface 33A is equal to the thickness D7 of the tip end 13 of the bumper flange 12.

Referring back to FIG. 3, the body 31 of the retainer 30 includes the wedge-shape space 39. The wedge-shape space 39 is formed, for example, closer to the design surface 24 of the front fender 20 with respect to the screw hole 40 and the first through hole 38; in other words, toward the inlet through which the bumper flange 12 is to be inserted into the body 31.

To form the wedge-shape space 39, at least one of the inner surfaces 33A and 34A of the clamp walls 33 and 34 at least partially includes a slope face. In the example illustrated in FIG. 3 and FIG. 4, the clamp wall 34 includes, in a part of the inner surface 34A, a slope face 43 corresponding to the slope face 16 of the bumper flange 12. More specifically, as described above, the wedge-shape portion 14, and clamp walls 33 and 34 are formed such that the inner surface 33A of the clamp wall 33 and the top surface 19 of the wedge-shape portion 14 are parallel to each other, and the slope face 43 of the clamp wall 34 and the slope face 16 of the wedge-shape portion 14 are parallel to each other.

The wedge-shape portion 14 and the wedge-shape space 39 may have shapes other than those illustrated in FIG. 3 and FIG. 4. It is only required that the wedge-shape portion 14 should have a thickness along the center axis C2 of the second through hole 15, which increases continuously toward the center axis C2 of the second through hole 15 (D2<D3), and the wedge-shape space 39 should be formed such that the distance between the inner surfaces 33A and 34A increases continuously toward the center axis C1 of the screw hole 40 (D4<D5).

Figure 14:
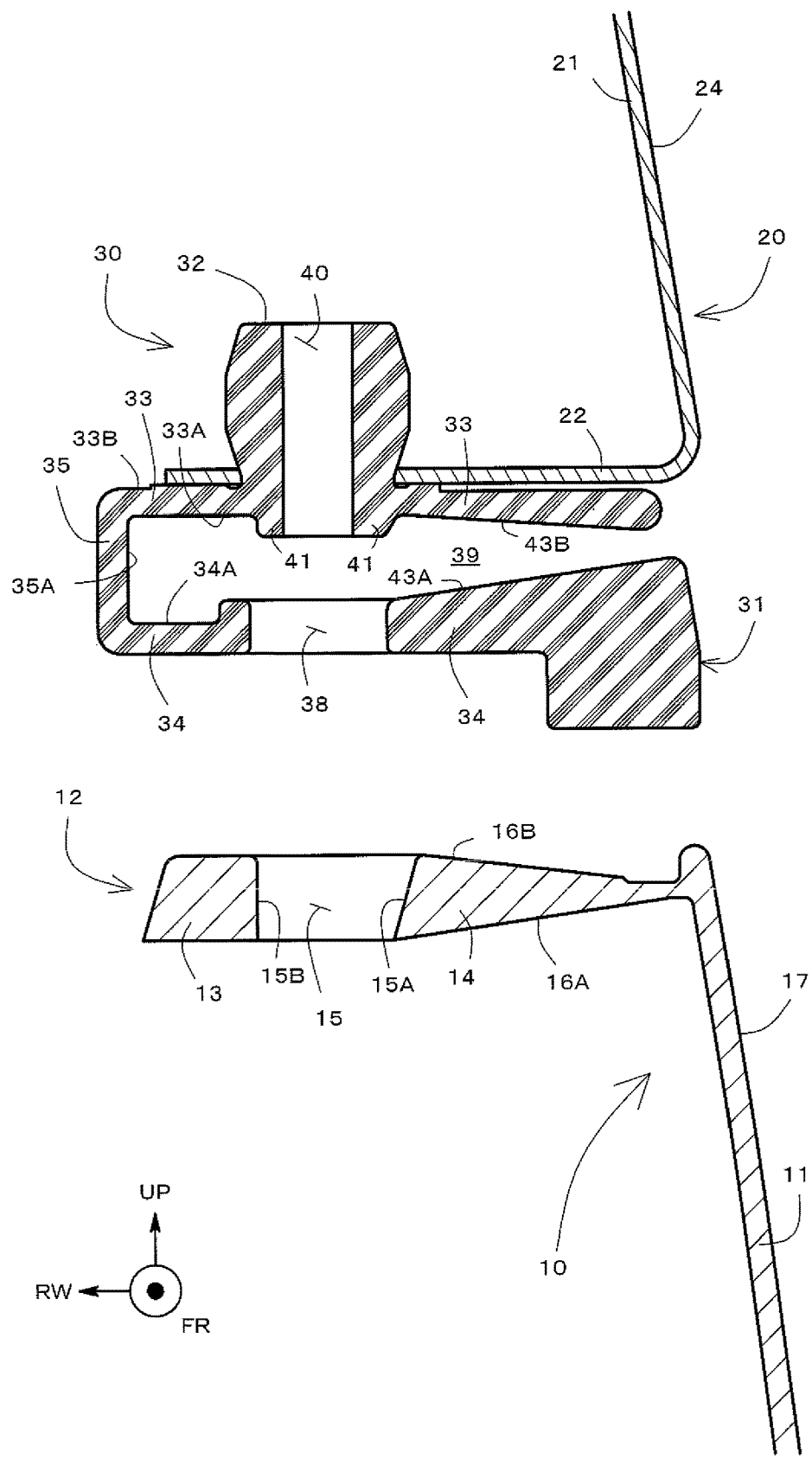
FIG. 14 is a cross sectional view taken along line A-A in FIG. 1, illustrating a modification example bumper fastening structure (a modification example of the wedge-shape portion and the wedge-shape space) according to the embodiment.

Thus, the wedge-shape portion 14 and the wedge-shape space 39 may have a two-side tapered structure as illustrated in FIG. 14, in place of a single-tapered structure as illustrated in FIG. 3 and FIG. 4. In this structure, the inner surface 33A of the clamp wall 33 includes an upward slope face 43B as illustrated, and the inner surface 34A of the clamp wall 34 includes a downward slope face 43A as illustrated. Similarly, the bumper flange 12 includes an upward slope face 16B on its upper surface and includes a downward slope face 16A on its lower surface.

As will be described below, in the process of fastening the front bumper 10 to the front fender 20, the wedge-shape space 39 is narrowed to move the wedge-shape portion 14. This causes the front bumper 10 to move relative to the retainer 30 and the front fender 20. The endpoint of this relative movement may be a time point at which the tip end 13 of the bumper flange 12 comes into contact with the connecting wall 35 of the retainer 30. In other words, the connecting wall 35 may be made to function as a stopper that stops the movement of the bumper flange 12.

In this case, as illustrated in FIG. 4, for example, a length W1 of a straight line L1 along the extending direction of the fender flange 22 from the inner face 35A of the connecting wall 35 to an intersection b between the straight line L1 and an extension line L2 extending from the design surface 24 of the front fender 20 is first determined. Then, a length W2 of a straight line L3 along the extending direction of the bumper flange 12 from the terminating end or the front end of the tip end 13 of the bumper flange 12 to an intersection c between the straight line L3 and the design surface 17 of the front bumper 10 is further determined. The bumper flange 12 and the retainer 30 are formed such that these distances W1 and W2 are equal to each other.

The bumper flange 12 and the retainer 30 are formed as described above, so that, when the tip end 13 of the bumper flange 12 comes into contact with the connecting wall 35, the design surface 24 of the front fender 20 and the design surface 17 of the front bumper 10 are aligned and flush with each other.

Referring to FIG. 2, the screw 50 is screwed into the screw hole 40 via the first through hole 38 of the retainer 30 and the second through hole 15 of the bumper flange 12. The screw 50 may be a tapping screw, and the inner surface of the screw hole 40 is threaded in association with screwing of the screw 50.

Fastening Process of Front Bumper

Referring to FIG. 6 to FIG. 9, the fastening process of the front bumper 10 by means of the bumper fastening structure according to the embodiment will be described. First, the fixing catch 32 of the retainer 30 and the guide pin 36 (see FIG. 2) are fitted into the fitting hole 23 of the fender flange 22. This fixes the retainer 30 to the fender flange 22.

Figure 6:
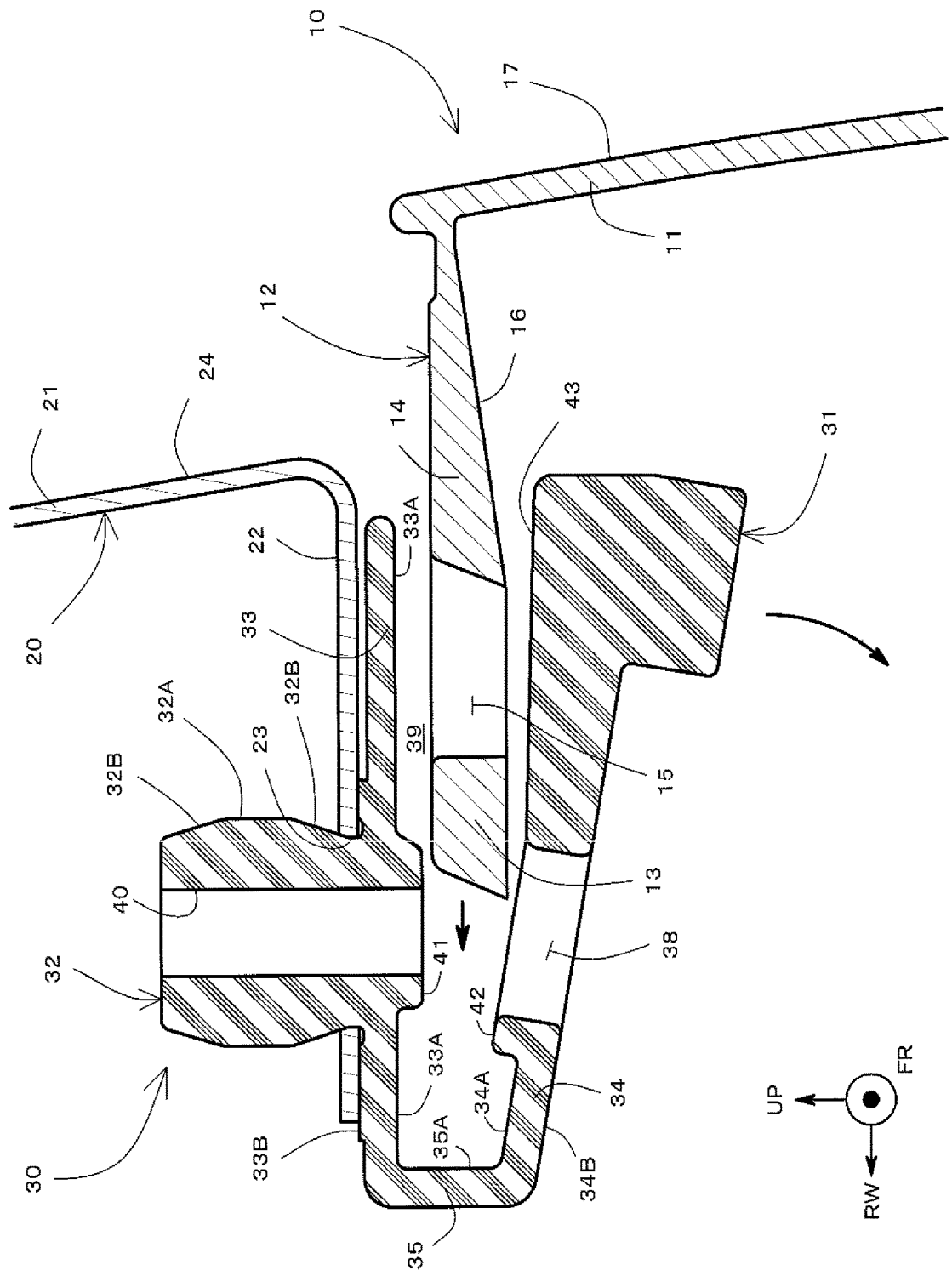
FIG. 6 is a cross sectional view taken along line A-A in FIG. 1, for explaining a first bumper fastening process (1/4) using the bumper fastening structure according to the embodiment.

Subsequently, as illustrated in FIG. 6, the bumper flange 12 at the terminating end of the front bumper 10 is inserted into the U-shape body 31 of the retainer 30. At this time, the bumper flange 12 may be inserted into the body 31; that is, between the clamp walls 33 and 34, with the clamp wall 34 of the retainer 30 being depressed to thereby expand the space between the clamp walls 33 and 34.

FIG. 7 illustrates a temporary securing state in which the bumper flange 12 is clamped or caught between the clamp walls 33 and 34, and the screw 50 has not yet been inserted. At this time, the inner surface 15B of the second through hole 15, which is an engaging portion of the bumper flange 12, engages with the temporary securing projection 41 of the retainer 30. This reduces removal of the bumper flange 12 from the retainer 30 in the vehicle width direction or in the RW axis direction.

As further illustrated in FIG. 7, the inner surface 15B of the second through hole 15 and the outer surface 41A of the temporary securing projection 41 are spaced apart in the vehicle width direction. This structure allows the bumper flange 12 to move, by this distance (D1), relative to the retainer 30 and the front fender 20 securing the retainer 30.

Figure 8:
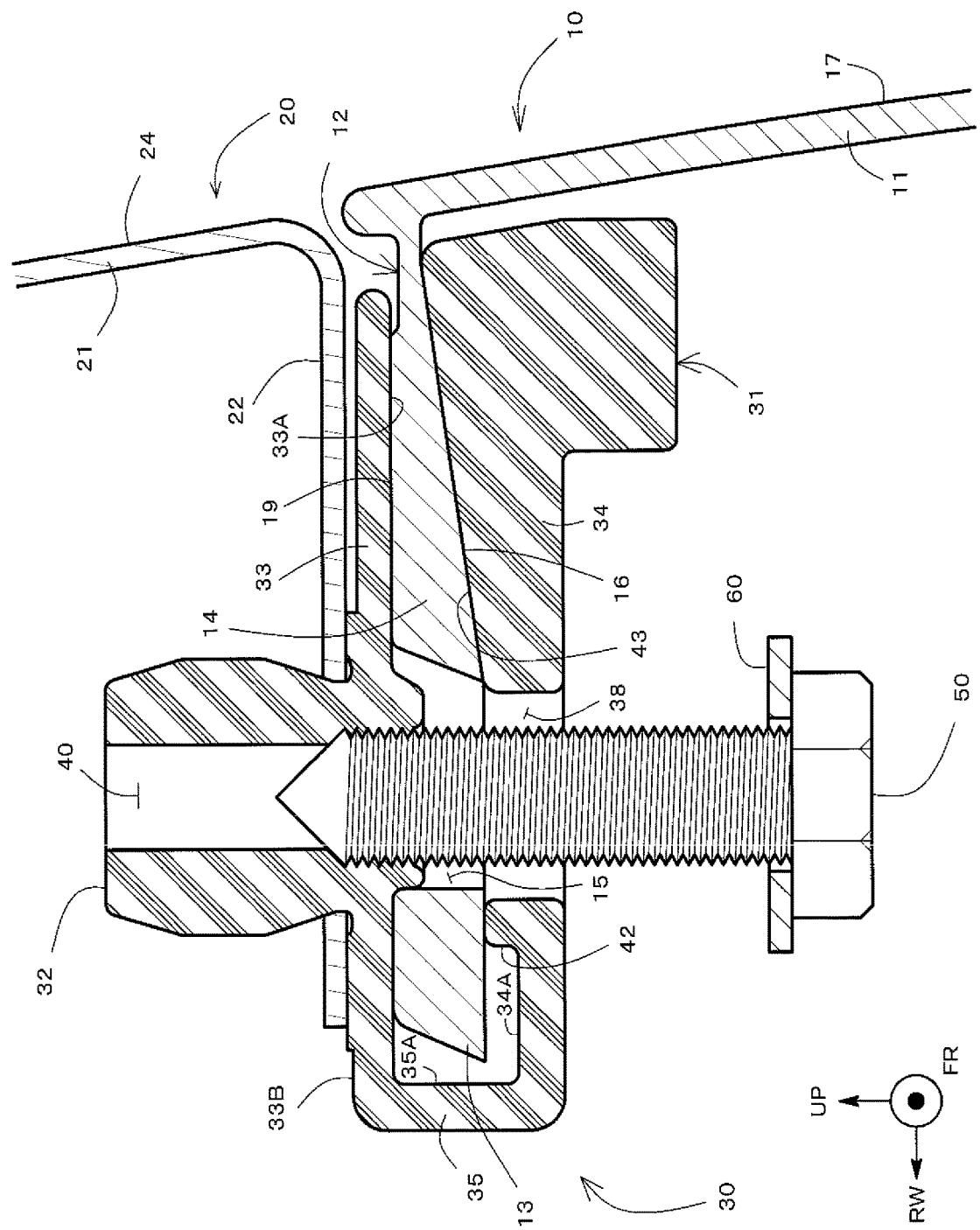
FIG. 8 is a cross sectional view taken along line A-A in FIG. 1, for explaining a third bumper fastening process (3/4) using the bumper fastening structure according to the embodiment.

Referring to FIG. 8, the screw 50 is screwed into the retainer 30 and the bumper flange 12 in the temporarily secured state. The screw 50 is inserted upward, and is screwed, via the first through hole 38 of the retainer 30 and the second through hole 15 of the bumper flange 12, into the screw hole 40. During this screwing, to disperse the bearing surface pressure and to increase the bearing surface area, the screw 50 may be screwed into the screw hole 40 via the washer 60.

Figure 9:
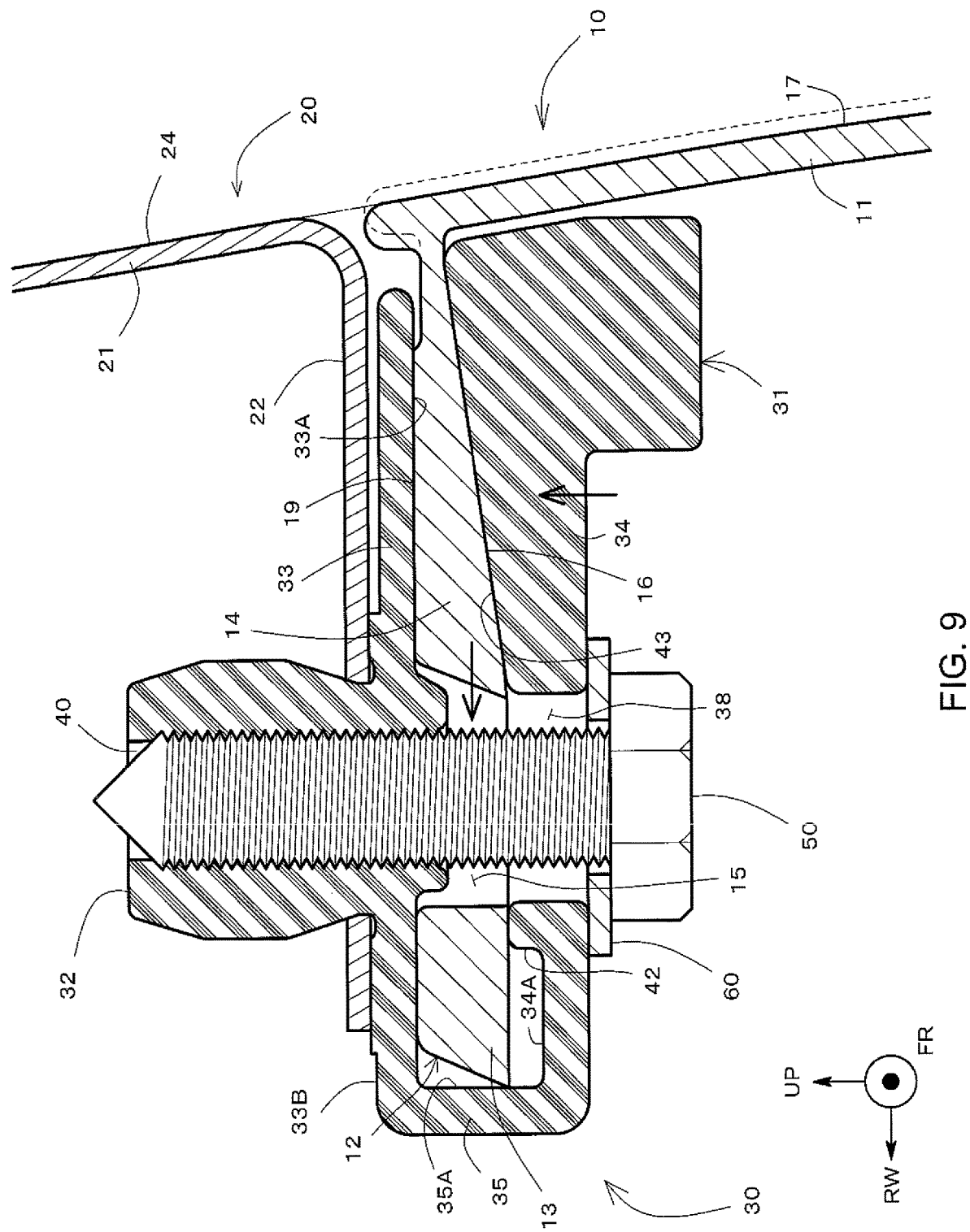
FIG. 9 is a cross sectional view taken along line A-A in FIG. 1, for explaining a fourth bumper fastening process (4/4) using the bumper fastening structure according to the embodiment.

The screw 50 which is screwed increases the diameter of the fixing catch 32, to fasten the fixing catch 32 to the fender flange 22 firmly. The screw 50 which is screwed further tightens together the clamp walls 33 and 34 of the retainer 30 and the bumper flange 12 clamped between the clamp walls 33 and 34. As illustrated in FIG. 9, the wedge-shape space 39 is narrowed as the clamp walls 33 and 34 are tightened, which extrudes the wedge-shape portion 14 of the bumper flange 12 toward the screw hole 40 (toward the connecting wall 35) accordingly. This results in the movement of the front bumper 10 relative to the front fender 20, making the design surface 24 of the front fender 20 and the design surface 17 of the front bumper 10 move relative to each other in the vehicle width direction.

As described above, the bumper fastening structure according to the present embodiment allows alignment between the design surface 24 of the front fender 20 and the design surface 17 of the front bumper 10 in accordance with tightening of the screw 50. In other words, the bumper fastening structure according to the present embodiment allows adjustment of the relative positions of the design surfaces 17 and 24 in accordance with the fastening torque of the screw 50.

If the relationship between the fastening torque and the moving amount of the front bumper 10 is known based on simulation, for example, alignment between the design surfaces 17 and 24 may be performed based on management of the fastening torque of the screw 50. For example, the projection amount D8 of the design surface 17 of the front bumper 10 with respect to the design surface 24 of front fender 20, in the temporary securing state (see FIG. 7), is obtained. Then, a fastening torque value corresponding to the projection amount D8 is obtained and set as an upper limit value of the fastening torque of a torque wrench. The torque wrench that is set is used to screw the screw 50 into the screw hole 40, thereby allowing the design surfaces 17 and 24 to be aligned and flush with each other.

Alternatively, the tip end 13 of the bumper flange 12 may be moved into contact with the connecting wall 35, to thereby align the design surfaces 17 and 24. In other words, the connecting wall 35 may be made to function as a stopper that stops movement of the bumper flange 12.

As described above, setting the distances W1 and W2 indicated in FIG. 4 to an equal value allows the design surfaces 17 and 24 to be aligned and flush with each other when the tip end 13 of the bumper flange 12 comes into contact with the connecting wall 35. This alignment method eliminates the need for strictly managing the fastening torque, and completes alignment of the design surfaces 17 and 24 by visually recognizing the tip end 13 of the bumper flange 12 coming into contact with the connecting wall 35.

OTHER EMBODIMENTS

Figure 15:
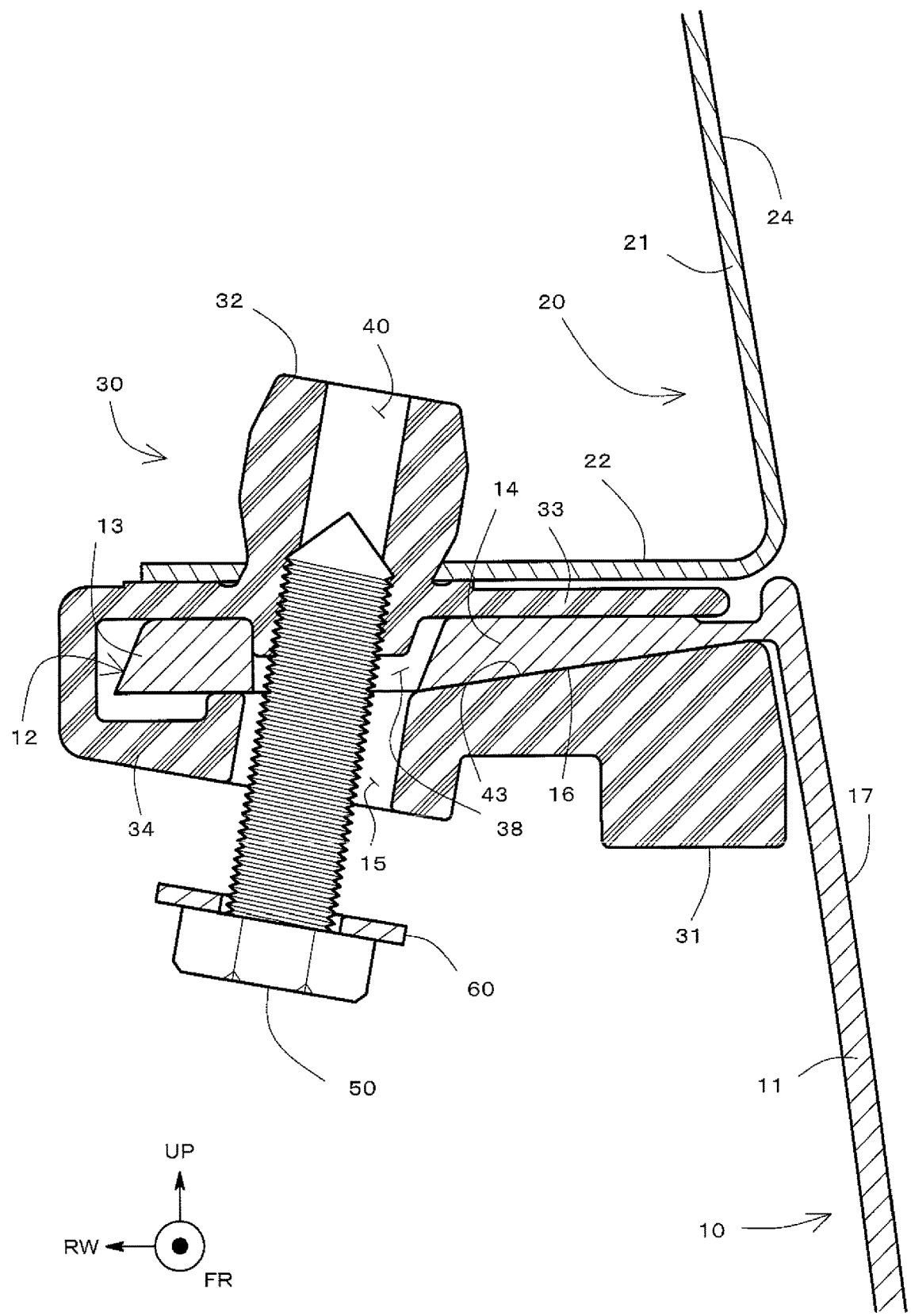
FIG. 15 is a cross sectional view taken along line A-A in FIG. 1, illustrating a modification example bumper fastening structure (a modification example of the boring angle of the screw hole) according to the embodiment.
Figure 16:
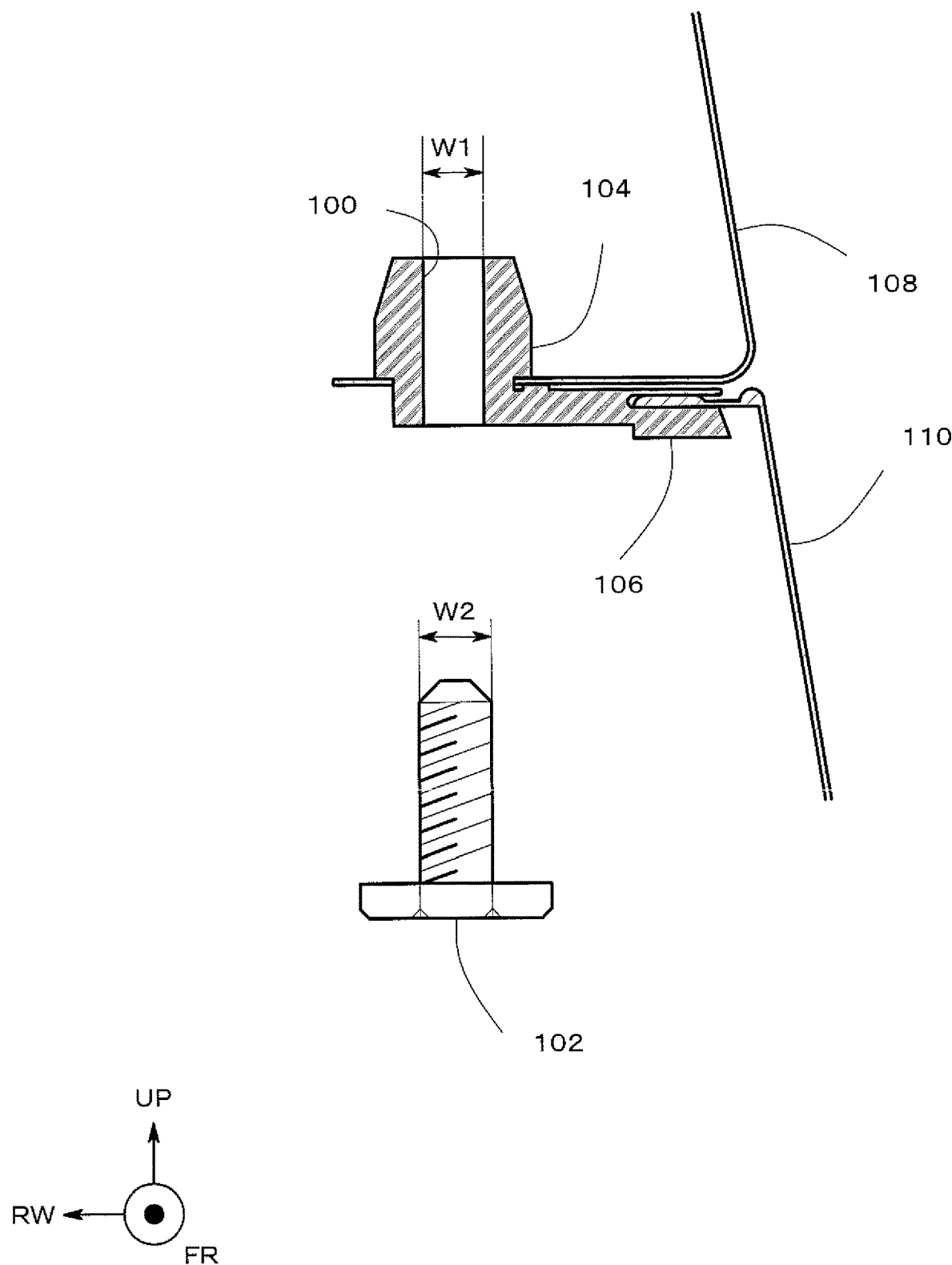
FIG. 16 is a diagram for explaining a conventional bumper fastening structure.
Figure 17:
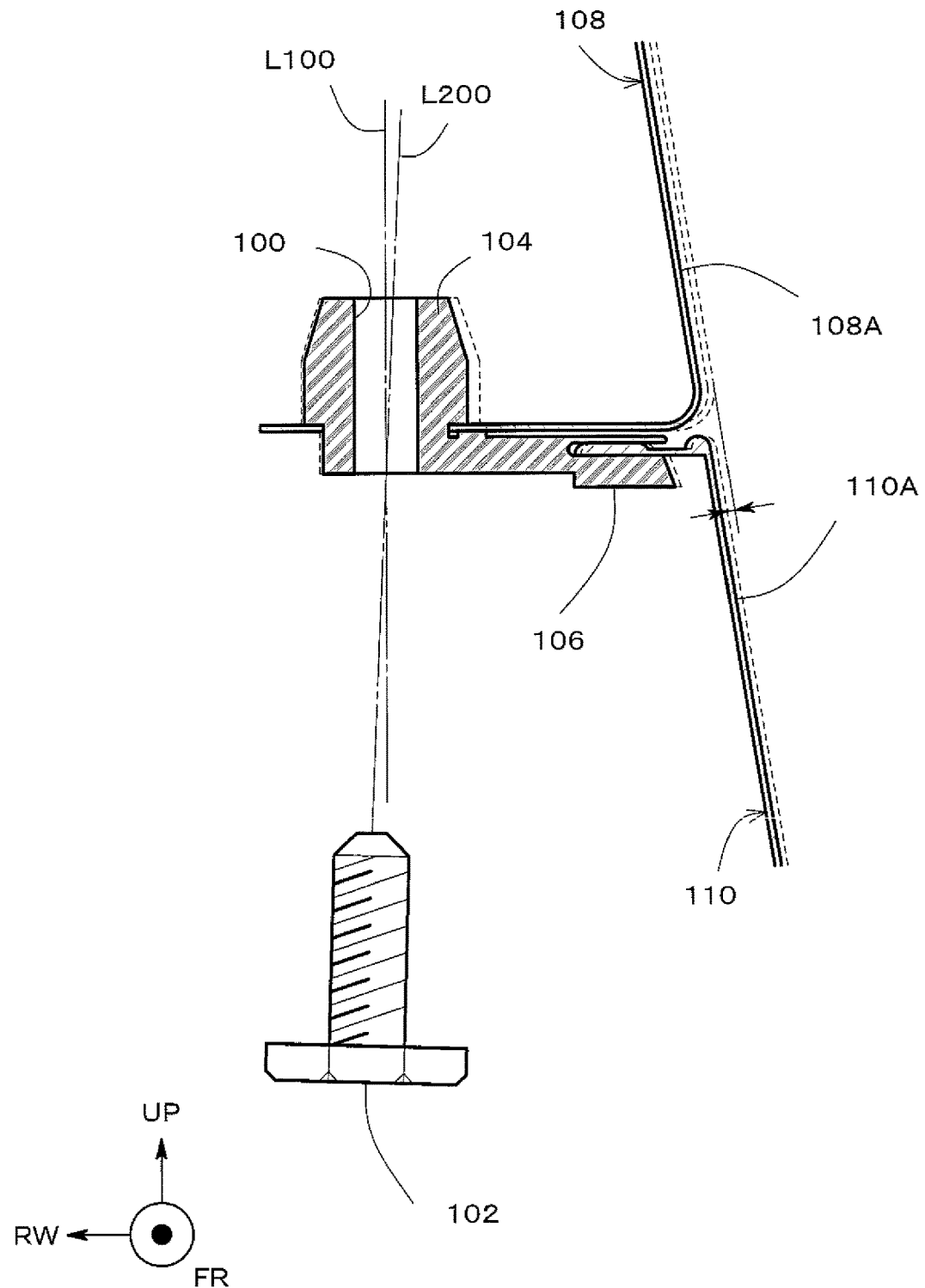
FIG. 17 is a diagram for explaining a misalignment between design surfaces of the bumper and the fender caused by so-called diagonal fastening.

While FIG. 1 to FIG. 14 illustrate the fixing catch 32 disposed vertically to the fender flange 22, and illustrate the screw hole 40, the first through hole 38, and the second through hole 15, each having the center axis vertical to the fender flange 22, the disclosure is not limited to this structure, and may have any structures in which fastening by means of the screw 50 causes the wedge-shape shape portion 14 to move. For example, as illustrated in FIG. 15, the fixing catch 32 may be disposed non-vertically to the fender flange 22, and the screw hole 40, the first through hole 38, and the second through hole 15 may have center axes that are non-vertical to the fender flange 22.

The present disclosure is not limited to the embodiments described above and may include all modifications and changes that do not depart form the technical scope or gist of the disclosure defined in the claims.

The invention claimed is:

1. A bumper fastening structure comprising:
a bumper;
a fender;
a retainer serving as a retaining member; and
a screw,
the retainer comprising:
a body having a U shape, the body including a pair of clamp walls configured to clamp a bumper flange that is a terminal end of the bumper and a connecting wall configured to connect the pair of clamp walls; and
a fixing catch protruding from an outer face of a first one of the clamp walls, the fixing catch being configured to be fitted in a fitting hole in a fender flange that is a terminal end of the fender,
wherein the fixing catch includes a screw hole formed in a protruding direction of the fixing catch,
wherein the pair of clamp walls include a temporary securing projection on at least one of inner faces,
wherein a second one of the clamp walls includes a first through hole along an extension line of the screw hole,
wherein at least one of the pair of clamp walls includes a slope face on the inner face, such that a distance between the inner surfaces of the pair of clamp walls increases toward the screw hole and a wedge-shape space is formed,
the bumper flange comprising:
a second through hole aligned with the screw hole and the first through hole;
an engaging portion configured to engage with the temporary securing projection; and
a wedge-shape portion corresponding to the wedge-shape space, the wedge-shape portion having a thickness along a central axis direction of the second through hole, the thickness increasing toward the second through hole,
the screw being configured to be screwed into the screw hole via the first through hole and the second through hole, to increase a diameter of the fixing catch and tighten the pair of clamp walls and the bumper flange clamped between the pair of clamp walls.

2. The bumper fastening structure according to claim 1, wherein
the temporary securing projection is a cylindrical projection formed on the inner surface of the first one of the clamp walls to surround the screw hole, and
the temporary securing projection is inserted into the second through hole of the bumper flange, with the outer surface of the temporary securing projection and the inner surface of the second through hole being spaced from each other.

3. The bumper fastening structure according to claim 1, wherein
the bumper includes a bumper body connected to a first end of the bumper flange and having a design surface, the bumper flange having a second end that is a tip end to face the connecting wall of the retainer,
the fender includes a fender body connected to a first end of the fender flange and having a design surface, and
when the tip end of the bumper flange comes into contact with the connecting wall of the retainer, the design surface of the bumper body and the design surface of the fender body are aligned.

4. The bumper fastening structure according to claim 2, wherein
the bumper includes a bumper body connected to a first end of the bumper flange and having a design surface, the bumper flange having a second end that is a tip end to face the connecting wall of the retainer,
the fender includes a fender body connected to a first end of the fender flange and having a design surface, and
when the tip end of the bumper flange comes into contact with the connecting wall of the retainer, the design surface of the bumper body and the design surface of the fender body are aligned.

\* \* \* \* \*